United States Patent [19]

Ostrander et al.

[11] Patent Number: 4,757,887
[45] Date of Patent: Jul. 19, 1988

[54] SPLIT THRUST/RETAINER RING FOR AN OVERRUNNING CLUTCH

[75] Inventors: Robert J. Ostrander, Sterling Heights; Kurt J. Magee, Ferndale, both of Mich.

[73] Assignee: Dana Corporation, Toledo, Ohio

[21] Appl. No.: 884,056

[22] Filed: Jul. 10, 1986

[51] Int. Cl.⁴ .................... F16D 41/00; F16C 17/04
[52] U.S. Cl. .................... 192/41 A; 192/45; 192/45.1; 384/420
[58] Field of Search ............ 192/41 A, 45.1, 45, 192/44; 384/908, 368, 369, 370, 371, 425, 420, 305; 403/DIG. 7

[56] References Cited

U.S. PATENT DOCUMENTS

| 2,371,653 | 3/1945 | Schuckers | 192/45 |
| 2,469,572 | 5/1949 | Pratt | 192/44 |
| 2,552,166 | 5/1951 | Gardiner | 384/425 |
| 2,872,256 | 2/1959 | Thomson | 384/420 |
| 2,994,570 | 8/1961 | Cousino | 384/420 |
| 3,298,756 | 1/1967 | Wilson | 384/420 |
| 3,361,237 | 1/1968 | Mathews | 192/45 |
| 3,635,535 | 1/1972 | Schultenkamper | 384/371 |
| 3,844,391 | 10/1974 | Hallerberg | 192/41 A |
| 4,130,325 | 12/1978 | Schultenkamper | 384/425 |
| 4,315,698 | 2/1982 | Takahashi et al. | 384/908 X |
| 4,421,425 | 12/1983 | Foucher et al. | 384/123 |
| 4,501,505 | 2/1985 | Chambers | 384/152 |
| 4,639,148 | 1/1987 | Tamura et al. | 384/368 X |

FOREIGN PATENT DOCUMENTS

| 0205320 | 12/1986 | European Pat. Off. | |
| 417156 | 8/1925 | Fed. Rep. of Germany | 403/DIG. 7 |
| 1278158 | 10/1961 | France | 192/45 |
| 0194136 | 11/1984 | Japan | 192/41 A |
| 449502 | 6/1936 | United Kingdom | |
| 698317 | 10/1953 | United Kingdom | 192/45.1 |
| 782193 | 9/1957 | United Kingdom | 384/305 |
| 1015503 | 1/1966 | United Kingdom | |
| 1431658 | 4/1976 | United Kingdom | |

OTHER PUBLICATIONS

"Which Stamped Retaining Ring?", Heinmann, *Product Engineering*, pp. 124–128, 2/50.
Waldes, TRUARC, pp. 7–16 (no date).

Primary Examiner—Rodney H. Bonck
Attorney, Agent, or Firm—MacMillan, Sobanski & Todd

[57] ABSTRACT

A thrust/retaining washer for use in an overrunning clutch is formed as an annular having a single split or opening therein. The washer is formed of an acetal resin material and the split allows it to be expanded to fit over the outside of a tubular inner race and snap into a radially extending circumferential groove formed in the outer cylindrical surface of the inner race. The washer thereby prevents rollers and/or spacers from escaping from the raceway between the inner race and outer race. The washer also abuts an inwardly facing surface of an end cap secured to the outer race to provide an axial thrust surface for the clutch. Radially extending lubrication grooves are formed in both radially extending planar surfaces of the washer to provide a path for lubrication to reach the internal elements of the clutch. The grooves are formed in both surfaces to permit the washer to be installed on the inner race without first orienting the washer.

10 Claims, 1 Drawing Sheet

SPLIT THRUST/RETAINER RING FOR AN OVERRUNNING CLUTCH

BACKGROUND OF THE INVENTION

The invention generally concerns overrunning clutches and, in particular, a combination thrust and retainer ring for holding the inner race of an overrunning clutch in position relative to an outer race, and for maintaining the associated clutch rollers within a raceway defined by the inner and outer races.

Many types of overrunning clutches are known in the prior art. For example, U.S. Pat. No. 3,361,237 discloses an overrunning clutch having an inner race typically fixed to a drive shaft and an outer race cooperating with the inner race to define a cylindrical raceway for a plurality of wedge assemblies and rollers. A pair of circular retainers are attached to the opposite sides of the outer race and extend adjacent the raceway to retain the wedges and the rollers. The inner race has opposed outwardly facing radial shoulders abutting a pair of sleeve bearings which, along with the retainers, are maintained in place by a pair of outer fittings or end caps attached to the outer race. A pair of seals are positioned between the sleeve bearings and the outer edges of the shoulders and are held in place by the end caps.

U.S. Pat. No. 3,844,391 discloses a sprag type freewheeling clutch having inner and outer cylindrical races forming a raceway. The sprags are held in the raceway by pins extending transverse to the longitudinal axis of the raceway, and the opposed ends of the pins are attached to a pair of circular cage plates. The outer surface of the inner raceway has a pair of circumferentially extending grooves formed therein for accepting a pair of spring rings which retain the cage plates and associated clutch elements between them in the raceway.

It is also known to provide a thrust bearing with lubrication grooves. U.S. Pat. No. 4,501,505 discloses a thrust bearing for use on a shaft against the face of a collar. The thrust bearing includes a base ring mounted on the shaft and having a plurality of shoes positioned on a surface facing the collar. A lubrication distribution groove is formed in the working face of each shoe and extends radially for substantially the entire length thereof.

U.S. Pat. No. 4,421,425 discloses a fixed pad thrust bearing having a ring of sector-shaped pads separated by grooves and facing a thrust collar integral with the rotor of a turbomachine within a thrust bearing cage. The outer surface of the ring bears on a deformable ring and the inner surface of the pads is formed with radially extending grooves for supplying oil to the surface of the thrust collar.

SUMMARY OF THE INVENTION

The invention concerns a thrust and retaining washer for use in an overrunning clutch. According to the present invention, a pair of specially designed washers are retained in spaced apart circumferentially extending grooves formed in the outer surface of the inner race of the clutch. The clutch rollers and spacers are retained between the two rings in the raceway formed by the cylindrical inner race and the cylindrical outer race of the clutch. A pair of circular end caps are attached one at either side of the outer race and extend into the raceway to engage the thrust and retaining washers. The washers are formed as a split ring having a plurality of radially extending oiling grooves formed in opposed faces thereof. Preferably, the washers are formed of a plastic material.

The thrust and retaining washer of the present invention has been found to reduce the wear on the associated clutch parts. Also, since the use of the thrust and retaining washer requires a reduced number of parts and assembly steps for the clutch, the cost to manufacture the overrunning clutch is greatly reduced.

BRIEF DESCRIPTION OF THE DRAWINGS

The various features, advantages and other uses of this invention will become more apparent by referring to the following detailed description and drawings, in which.

DESCRIPTION OF THE PREFERRED EMBODIMENT

Figure 1:
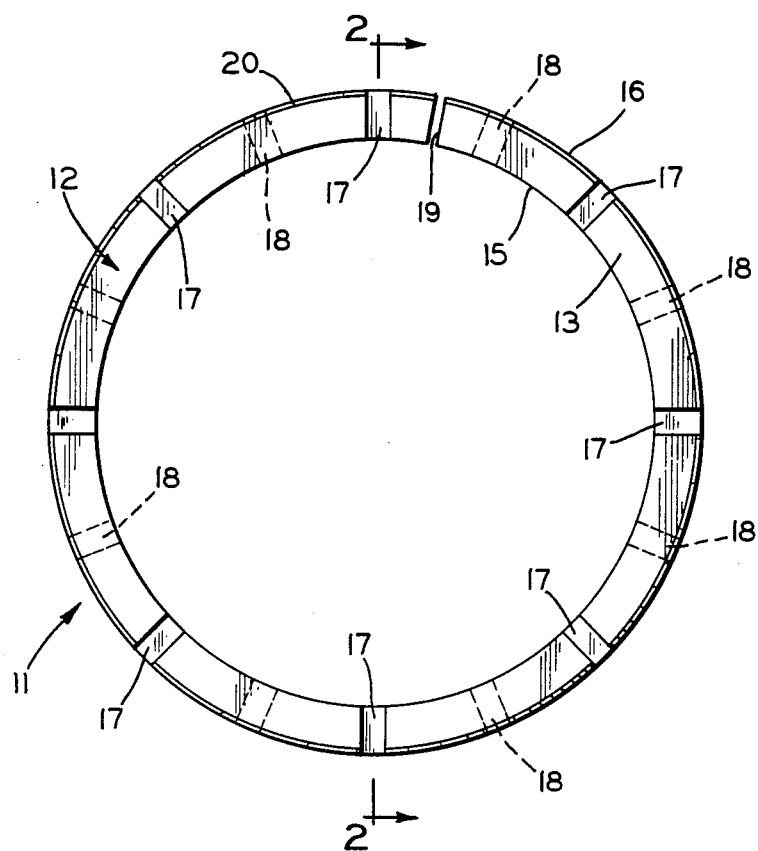
FIG. 1 is a front elevational view of a thrust and retaining washer according to the present invention.
Figure 2:
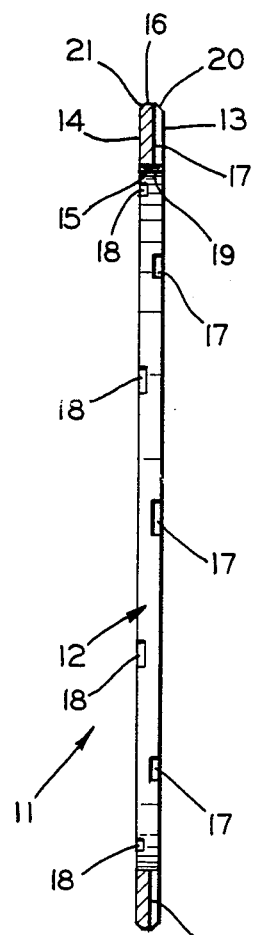
FIG. 2 is a cross-sectional view of the washer shown in FIG. 1 taken along the line 2—2.

There is shown in FIGS. 1 and 2 a thrust/retaining washer 11 according to the present invention. The washer 11 includes a ring-like body 12 having opposed, generally planar surfaces 13 and 14 extending perpendicular to the longitudinal axis of the body 12 and connected at inner edges by a radially inwardly facing surface 15 and at outer edges by a radially outwardly facing surface 16. The planar surface 13 has a plurality of radially extending, generally equally spaced slots or grooves 17 formed therein. Each groove 17 extends between the surfaces 15 and 16 for delivering oil to the overrunning clutch assembly as will be described below. A similar plurality of slots or grooves 18 are formed in the planar surface 14. As shown in FIG. 1, in the preferred embodiment of the invention, there are eight of the grooves 17 and eight of the grooves 18 equally spaced about the circumference of the body 12.

The body 12 also has a split or opening 19 formed therein. Although shown in FIG. 1 as being spaced approximately equidistant from a pair of the grooves 17 and 18, the opening 19 can be formed in any suitable location. The outwardly facing surface 16 is chamfered at 20 where it meets the outer edge of the surface 13 and at 21 where it meets the outer edge of the surface 14.

Figure 3:
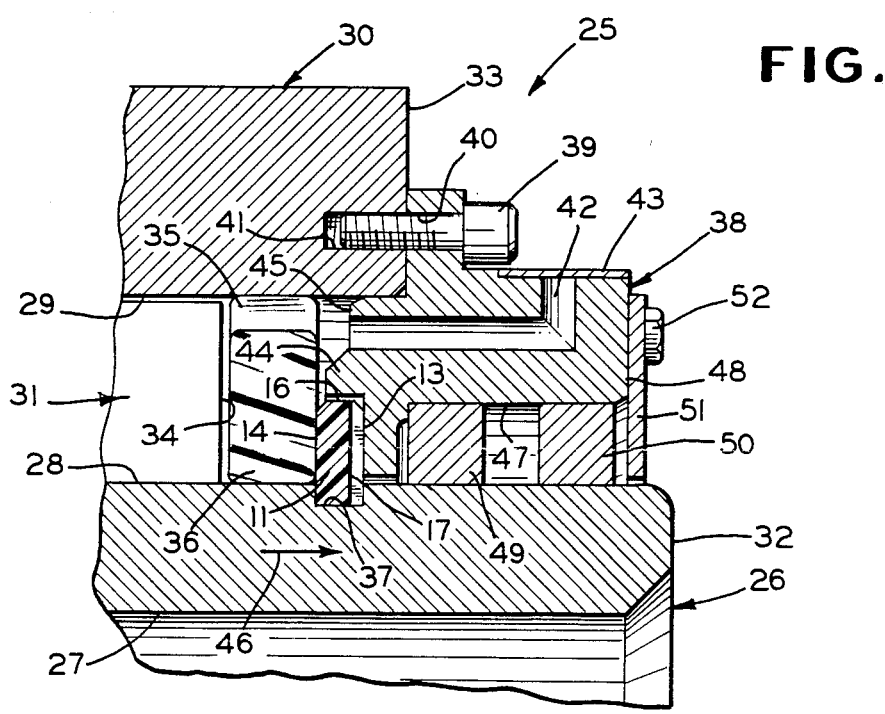
FIG. 3 is a cross-sectional fragmentary view of an overrunning clutch incorporating a washer according to the present invention.

There is shown in FIG. 3 a fragmentary cross-sectional view of an overrunning clutch 25 which includes the thrust/retaining washer 11 of the present invention. The clutch 25 includes a generally tubular inner race 26 which can be mounted on a shaft (not shown) extending through a longitudinally extending aperture 27 formed in the inner race 26. An outer cylindrical surface 28 of the inner race 26 faces an inner cylindrical surface 29 of a generally tubular outer race 30 to form a raceway therebetween.

A plurality of circumferentially spaced sprags cooperate to form a conventional sprag assembly 31. The sprag assembly 31 is positioned in the raceway and is spaced inwardly from corresponding end surfaces 32 and 33 of the inner race 26 and the outer race 30. As is well known, the sprag assembly permits rotation of the outer race 30 relative to the inner race 26 in one direction, but prevents relative rotation between the races 30 and 26 in an opposite direction. Positioned adjacent an end surface 34 of the sprag assembly 31 are a roller 35 and a spacer 36. The roller 35 is typically formed of metal and the spacer 36 is typically formed of a nylon material and both are representative of a plurality of such elements alternately spaced about the outer cylindrical surface 28 in the raceway. The rollers 35 and spacers 36 are maintained in position adjacent the end surface 34 by the washer 11.

A circumferentially extending groove 37 is formed in the outer cylindrical surface 28 between the end surface 34 of the sprag assembly 31 and the end surface 32 of the inner race 26. The diameter of the bottom wall of the groove 37 is approximately equal to the diameter of the inwardly facing surface 15 of the washer 11. Since the body 12 of the washer 11 is split at the opening 19, the body can be deformed to permit the washer 11 to be inserted over the end surface 32 and onto the outer cylindrical surface 28 of the inner race 26. When the washer 11 reaches the groove 37, it will snap back to the shape shown in FIG. 1. The sidewalls of the groove are spaced apart approximately the thickness of the body 12 to abut the planar surfaces 13 and 14 and prevent movement of the washer 11 along the longitudinal axis of the inner race 26. The planar surface 14 of the washer 11 abuts the rollers 35 and the spacers 36 and prevents them from moving out of the raceway.

A ring-like end cap 38 is attached to the outer race 30 at the end surface 33 by one or more cap screws 39 extending through an aperture 40 formed in the peripheral edge portion of the end cap 38 and threadably engaging a threaded aperture 41 formed in the end surface 33. Typically, a plurality of the cap screws 39 are utilized to attach the end cap 38 to the outer race 30 and are approximately equally spaced about the circumference of the end cap 30. A lubrication passage 42 is formed in the end cap 38 and has a generally radially extending end in fluid communication with an exterior surface of the end cap 38. During normal operation, the radially extending end of the passage 42 is closed by a cover plate 43 which can be secured to the end cap 38 by any suitable means.

A generally axially extending end of the lubrication passage 42 is open to the raceway adjacent the rollers 35 and spacers 36. If necessary, more than one of the passageway 42 can be provided, for example, one passageway for each of the lubrication grooves 17 and 18. The passageway 42 opens to an inwardly facing surface 45 of the end cap 38. An axially extending circumferential lip or flange 44 is formed on the surface 45 between the opening to the passageway 42 and the outwardly facing surface 16 of the washer 11. The flange 44 prevents the washer 11 from expanding out of the groove 37 under centrifugal force. That portion of the inwardly facing surface 45 located radially inwardly of the flange 44 and the planar surface 13 of the washer 11 function as thrust surfaces for axially directed forces in the direction of the arrow 46 acting through the inner race 26, the rollers 35, and/or the spacers 36.

The end cap 38 also includes an annular recessed portion 47 which is open to its outwardly facing end surface 48. A pair of annular seals 49 and 50 are positioned in the recess 47 abutting the outer cylindrical surface 28 of the inner race 26 and the radially inwardly facing cylindrical surface of the recess 47 to seal the clutch elements in the raceway from dirt and fluids. The opening to the recess 47 is closed by a ring-like cover plate 51 which is attached to the end surface 48 of the end cap 38 by one or more threaded fasteners 52.

The thrust/retaining washer 11 according to the present invention is formed as a split ring rather than two half rings according to the prior art. The body 12 is formed of a material such as Delrin which is a registered trademark of DuPont de Nemours & Co., Inc. for acetal resin material. The one-piece design reduces the cost of manufacturing and the cost of assembly of an overrunning clutch. Furthermore, it has been found that the washer according to the present invention exhibits reduced wear characteristics as compared with previous two-piece washers made of metal.

FIG. 3 is a fragmentary cross-sectional view of one side or end of the overrunning clutch 25. The other side can be formed as a mirror-image utilizing a second thrust/retaining washer 11 in a similar manner.

It should be noted that the thrust/retaining washer of the present invention has been illustrated and described in what is considered to represent its preferred embodiment. However, the invention may be practiced otherwise than as specifically illustrated and described without departing from the scope of the attached claims.

What is claimed is:

1. In an overrunning clutch having a generally cylindrical inner race cooperating with a generally tubular outer race to form a raceway therebetween, a thrust/retaining washer comprising:
an annular body formed as a split ring having a single opening therein and adapted to engage a radially extending circumferential groove formed in an outer cylindrical surface of an inner sleeve adjacent a raceway, said body having a first radially extending planar surface abutting elements of an overrunning clutch in the raceway and a second radially extending planar surface abutting an inner surface of an end cap attached to an outer race to enclose said raceway, said body being chamfered between said outer edge and said first planar surface and being chamfered between said outer edge and said second planar surface.

2. The washer according to claim 1 wherein said body is formed of a cetal resin material.

3. The washer according to claim 1 including at least one lubrication groove formed in said first planar surface between said outer edge and said inner edge of said body.

4. The washer according to claim 3 wherein said second planar surface has at least one lubrication groove formed therein between said outer edge and said inner edge of said body.

5. An overrunning clutch comprising:
a generally tubular inner race adapted to be mounted on a driving shaft;
a generally tubular outer race cooperating to define a raceway between an outer cylndrical surface of said inner race and an inner cylindrical surface of said outer race;
a plurality of clutch elements positioned in said raceway;
an annular end cap attached to said outer race and cooperating with said inner race to enclose the raceway; and
a thrust/retaining washer formed as a split ring and having an inner edge positioned in a radially extending circumferential groove formed in said outer cylindrical surface of said inner race, said washer having a first radially extending planar surface facing said clutch elements and a second radially extending planar surface abutting an inwardly facing surface of said end cap, said end cap provided with an axially extending inner end portion having a generally cylindrical inner surface located adjacent to and surrounding an outer edge of said washer for maintaining said washer within said groove.

6. The overrunning clutch according to claim 5 including at least one lubrication groove formed in said first planar surface extending between said outer edge of said washer and said inner edge of said washer.

7. The clutch according to claim 6 wherein said washer is formed of acetal resin material.

8. A thrust/retaining washer comprising:
an annular one piece body formed of a resin material, said annular body split once to provide two circumferentially adjacent end portions and having concentric inner and outer circular edge surfaces joined by a pair of opposed radially extending generally planar surfaces;

at least one of said planar surfaces provided with a lubrication groove formed therein connecting said outer edge surface to said inner edge surface;

said body being chamfered at the connections of said outer edge surface to said planar surfaces.

9. The washer according to claim 8 wherein said body has a plurality of radially extending lubrication grooves formed in said one radially extending planar surface between said outer edge surface and said inner edge surface.

10. The washer according to claim 8 wherein said body includes a plurality of radially extending grooves formed in each of said radially extending planar surfaces of said body between said outer edge surface and said inner edge surface.

* * * * *